United States Patent
Radhakrishnan et al.

(10) Patent No.: US 7,400,945 B2
(45) Date of Patent: Jul. 15, 2008

(54) ON-DIE TEMPERATURE MONITORING IN SEMICONDUCTOR DEVICES TO LIMIT ACTIVITY OVERLOAD

(75) Inventors: Sivakumar Radhakrishnan, Portland, OR (US); Michael Wiznerowicz, Beaverton, OR (US); Jed D. Griffin, Forest Grove, OR (US); Kapilan Maheswaran, Beaverton, OR (US); Scott Rushford, Hillsboro, OR (US); David J. Hotz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 474 days.

(21) Appl. No.: 11/088,445

(22) Filed: Mar. 23, 2005

(65) Prior Publication Data
US 2006/0242447 A1    Oct. 26, 2006

(51) Int. Cl.
G06F 19/00    (2006.01)
B29C 45/00    (2006.01)
G05B 9/02    (2006.01)

(52) U.S. Cl. .................. 700/299; 700/108; 700/205; 702/130; 702/131; 702/132; 713/501
(58) Field of Classification Search ............. 700/108, 700/205, 299; 702/130–132; 713/501
See application file for complete search history.

(56) References Cited

U.S. PATENT DOCUMENTS

| 5,281,026 | A  | * | 1/1994 | Bartilson et al. | 374/143 |
| 6,421,754 | B1 | * | 7/2002 | Kau et al. | 710/261 |
| 6,701,272 | B2 | * | 3/2004 | Cooper et al. | 702/132 |
| 2006/0066384 | A1 | * | 3/2006 | Jain et al. | 327/378 |

* cited by examiner

*Primary Examiner*—Michael D. Masinick
(74) *Attorney, Agent, or Firm*—Blakely, Sokoloff, Taylor & Zafman LLP

(57) ABSTRACT

Thermal control for a controller in a data processing environment is described. In one embodiment, the invention includes detecting a temperature of a semiconductor device at a thermal sensor on the semiconductor device, comparing the detected temperature to a threshold, and generating a high interrupt if the temperature is above the threshold and a low interrupt if the temperature is below the threshold.

21 Claims, 5 Drawing Sheets

ON-DIE TEMPERATURE MONITORING IN SEMICONDUCTOR DEVICES TO LIMIT ACTIVITY OVERLOAD

BACKGROUND

1. Field

The present description relates to thermal management of semiconductor devices and in particular to sensing temperature on a memory or I/O (Input/Output) interface chip and generating interrupts to a thermal management system.

2. Related Art

Semiconductor devices generate heat internally that, if left uncontrolled, can destroy the device. The heat generated by a device is related to its operating speed, its operating voltage and its level of activity. To dissipate extra heat, a device may be equipped with a large cooling surface, heat fins, fans or a more complex liquid cooling system. The cooling system allows the device to operate at some level of activity without overheating.

Semiconductor devices are normally designed to operate at a fixed speed and voltage based on a prediction of normal activity levels and cooling systems. As a result, when the device has less activity or is provided with better cooling, the device operates at a lower bandwidth than its cooling system would allow. In other words the device handles less data more slowly than it could. Even at expected activity and cooling levels, many devices run at a lower rated bandwidth in order to accommodate a sudden increase in activity.

In the event of an extended increase in activity or a failure of the cooling system, some semiconductor devices use some type of thermal management system that can protect the device from overheating before a crisis occurs. In a memory controller hub (MCH) or host controller, the thermal management system may analyze the level of I/O activity being processed or waiting to be processed and then reduce the rate of data processing if there is too much activity. This approach cannot compensate for a failed fan or overheated room.

An MCH may be used to interface one or more CPUs (central processing units) with memory and I/O (input/output) devices commonly used in desktop, notebook, workstation and server-based computer systems including web servers, transaction based servers, database management servers, file servers, and blade/network servers. These systems can experience situations that cause unforeseen surges in the chipset activity. Some such situations include a power virus caused by hacker activity or an unusually loaded system with very high utilization. The MCH and the rest of the chipset then are forced to supply a high request rate across the chipset interfaces causing high power demands and generating more heat. If the high request rate lasts for too long, then the chip may be permanently damaged by the heat that it generates.

BRIEF DESCRIPTION OF THE FIGURES

The invention may be more fully appreciated in connection with the following detailed description taken in conjunction with the accompanying drawings, in which like reference numerals refer to corresponding parts throughout the several views of the drawings, and in which.

DETAILED DESCRIPTION

In one embodiment of the present invention, a thermal sensor is implemented in a MCH (memory controller hub) chip with intelligent on-die temperature monitoring and hysteresis control. Highly accurate temperature readings, on the order of a few degrees or less are exploited using an intelligent interrupt generation logic that provides quick response to a connected CPU (central processing unit) when the threshold crossing has been met. In one embodiment, software at the CPU acts promptly to throttle down activity and prevent permanent damage to the MCH chip. The interrupt generation logic, allows a temperature readout from internal MCH registers much more quickly than a SMBUS (system management bus) protocol. Protocols such as SMBUS use a polling mechanism. This adds a latency that may slow any response to temperature changes and may potentially allow the chip to be damaged.

In one embodiment of the present invention, the interrupt generation logic may use programmatically adjustable threshold crossing points to produce a hysteresis function. This allows closed loop feedback to thermal management software.

Figure 1:
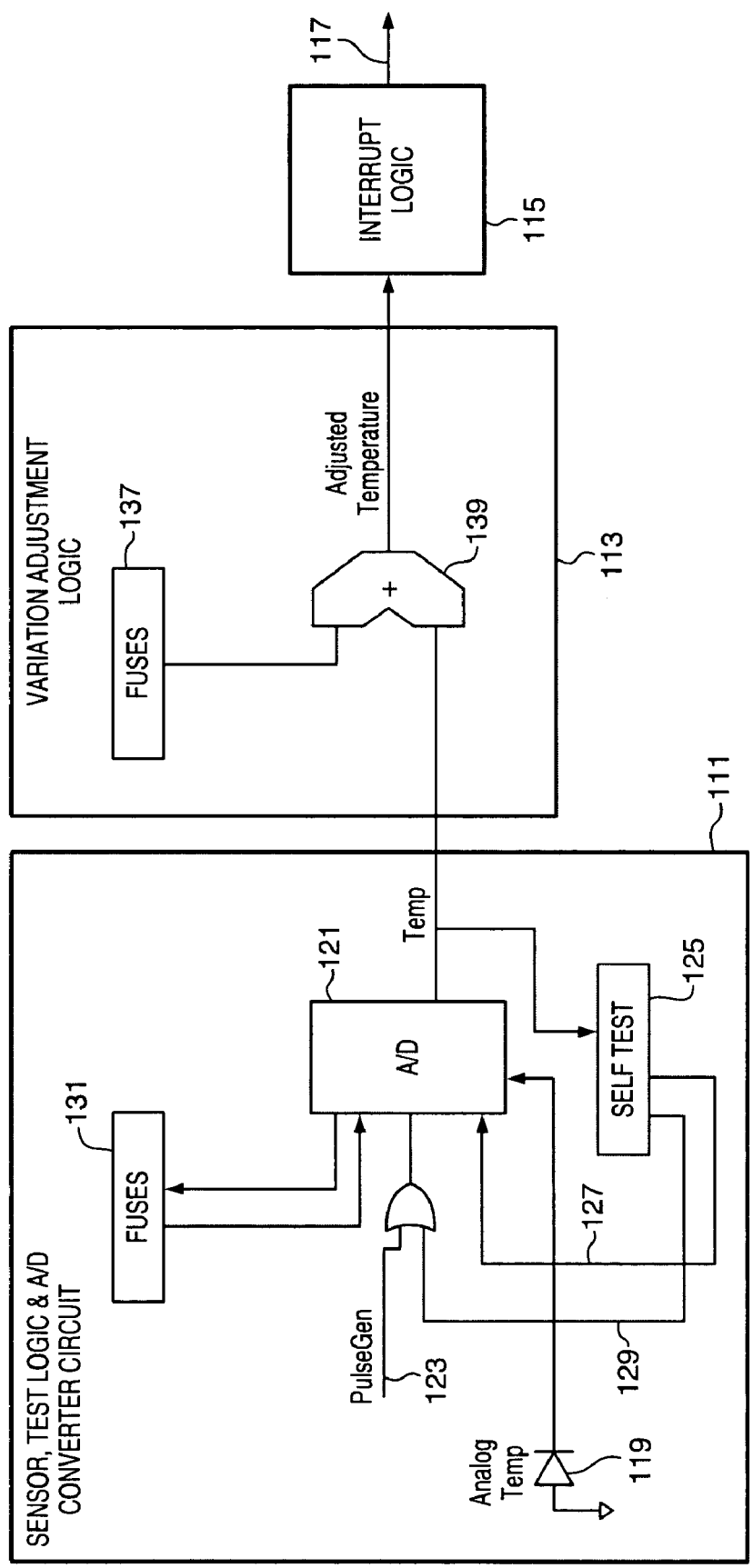
FIG. 1 is a block diagram of logic blocks suitable for implementing an embodiment of the present invention.

FIG. 1 is a block diagram of the thermal sensor test logic circuitry according to an embodiment of the present invention. The circuitry shown in FIG. 1 may reside on a single chip or the thermal sensor may be on a different chip than the other components. In FIG. 1, thermal test logic 111 may include a thermal diode 119 coupled to an A/D (analog to digital) converter 121, for example an 8-bit SA (successive approximation) A/D converter. In the figure, the converter produces a signal that is supplied to variation adjustment logic 113 which is coupled to interrupt generation logic 115. The thermal diode and A/D converter translate the sensed temperature to a digital value that is adjusted in the adjustment logic. This digital value is compared to target values and applied to the interrupt generation logic 115. If the tests in the logic are passed, then an interrupt 117 is generated and passed to software or to special thermal management circuitry to apply some form of thermal management. In one embodiment, the traffic rate on the chip is adjusted. In another embodiment, chip clock rates and voltages are adjusted. In another embodiment, cooling equipment is operated.

The thermal diode may be placed in a hot spot on the die of any semiconductor device. In the example of a MCH (memory controller hub) chip, a suitable hot spot may be near an interface to external system memory. The thermal sensor may be placed in any location that will change temperature consistently and quickly with the hottest portions of the die. For a thermal diode in a chip hot spot, the diode may be designed to provide an accurate measurement from normal operating temperatures up to the maximum temperature that can be sustained. For the example of an MCH coupled to current high speed processors, a thermal sensor temperature range from about 75° C. to about 125° C. is sufficient to cover all necessary temperatures.

The thermal diode 119 generates an analog voltage based on resistance across a thermal junction and this voltage may be applied to the A/D converter 121. With an eight bit converter temperature values from 0 to 127.5 degrees may be represented to within a resolution of 0.5 degrees. This may exceed the accuracy of the thermal sensor. Additional thermal diodes may be placed in other locations of the die. The multiple temperature values may be combined in different ways including averaging and taking the largest value. The temperature values may be converted in a single A/D converter or may be converted individually and operated on by appropriate logic. Other thermal sensors may also be used instead of a thermal diode. Transistors, sequences of diode pull-down legs, resistors and other devices may be used depending on the desired sensitivity, temperature range and other design considerations.

The thermal test logic 111 includes a clock source to control sampling rates for the diode and to enable and disable the A/D converter as well as a self test engine 125. The self test engine generates a test count 127 that is coordinated with a test enable timing signal 129. These are applied to the A/D converter to calibrate the converter. The converter generates an output signal that is applied to the self test engine and compared to the desired result. If the results of the test indicate that the operating window is skewed so that the output is not linear with temperature over the sensing range then an adjustment may be made.

A set of fuse bits 131 may be set to adjust the A/D converter based on the test results. This allows variations in the operation window, sample and hold, timing and other circuitry of the converter to be compensated. Variations in manufacturing and variations that occur during use may be adjusted for using the self test engine to provide more accurate and more reliable temperature readings. Other components may be used to provide the calibrated adjustment, like register values, adders and other devices.

The variation adjustment logic 113 allows the thermal sensor to be further calibrated. This further improves accuracy. Higher accuracy allows the die to safely operate still closer to its thermal limits. Due to manufacturing variations, sensors on different dies may differ by several degrees. The variation adjustment logic allows an adjustment to be made to compensate for these inconsistencies. As a part of the manufacturing, testing or burn-in process, the die may be exposed to a known temperature. The thermal sensor output may then be compared to the reference value. A set of thermal offset fuses 137 within the variation adjustment logic 113 may be set to compensate for this difference. In one embodiment, there are eight thermal offset bits including a sign bit. This programmed-in value may be accumulated with the digital temperature read out of the sensor using a 2's complement adder 139.

Figure 2:
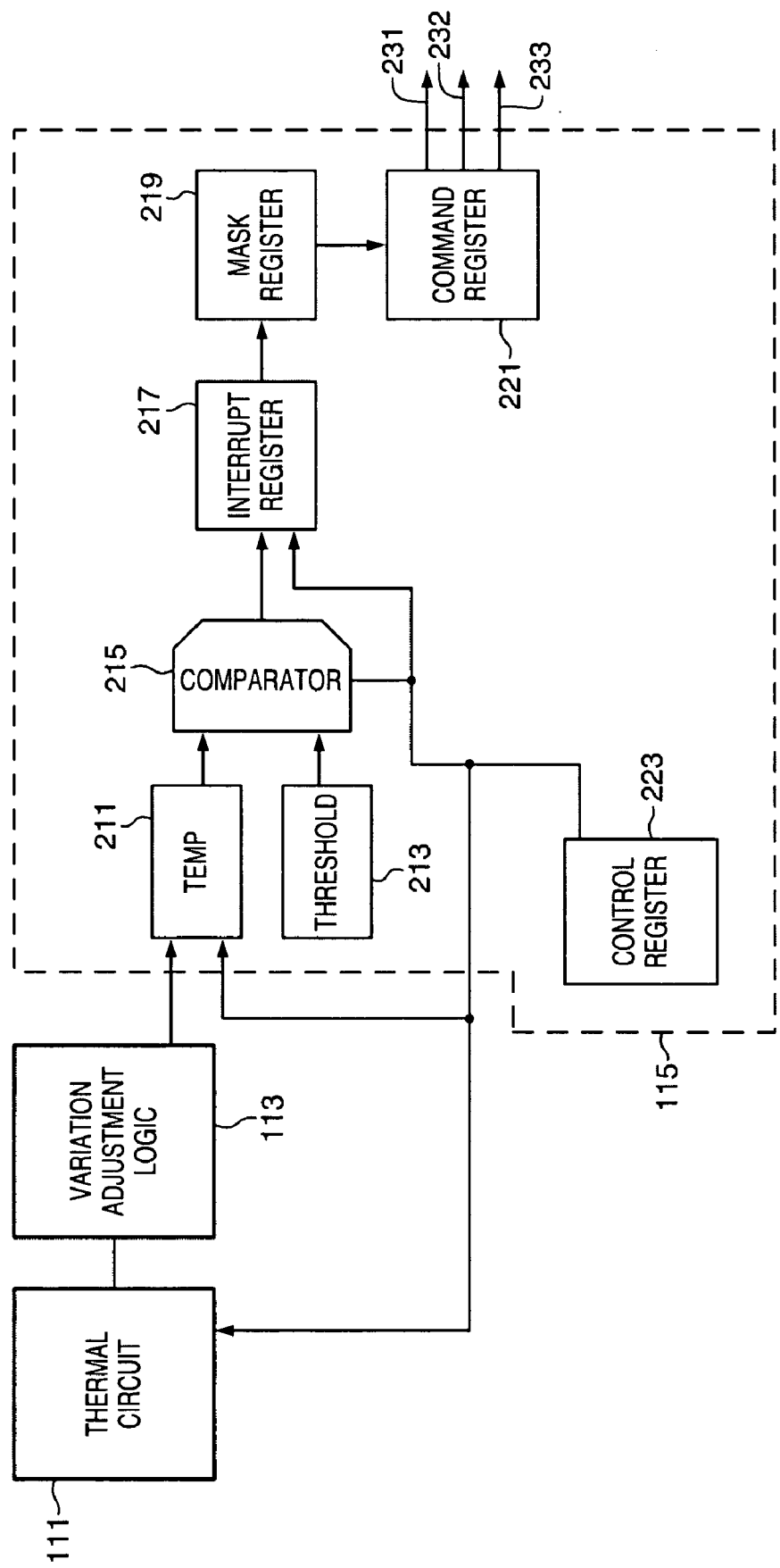
FIG. 2 is a block diagram of the buffer interrupt logic of FIG. 1 in more detail.

FIG. 2 shows more detail of the thermal sensor interrupt logic 115 of FIG. 1. In FIG. 2, the temperature signal that has been calibrated and adjusted is received in the interrupt logic in a temperature register 211. One or more thresholds are stored in a threshold register 213. In one embodiment for a MCH chip, the high threshold is 100° C. and the low threshold is 90° C. The particular thresholds to be applied will depend upon the particular device and its intended use. The temperature value is compared to the one or more thresholds by a comparator 215 which then sends the results to interrupt registers 217. The interrupt registers store temperature values and interrupt status values as is described in more detail below.

The interrupt register generates interrupt bits that are applied to a mask register 219. The result from the mask is then applied to a command register 221. The command register results are applied as commands to the thermal management regime. In one embodiment, the command register is a set of three different states that are asserted on external pins 231, 232, 233 of the die. The three states are 0 for normal operation, 1, for high temperature operation, and 2 for over-heating. The thermal management may speed up I/O rates for status 0, reduce I/O rates for a status 1 and shut down the chip for status 2. In the example of FIGS. 1 and 2, the internal analog values from the thermal sensor of this circuit are not brought out to the external package pins. This reduces the effects of noise on the analog values.

Many other and additional command states may be generated to suit a particular application. In addition, the thermal state may be signaled in many different ways. For example, a software signal may be provided to the thermal management or I/O management systems. Alternatively the values in the command register or some other register may be made accessible to software or hardware processes. In one embodiment, all of the registers are accessible using SMBUS protocols.

A control register 223 provides enable bits to latch the thermal sensor and enable thermal interrupts. In particular, in the example shown in FIG. 2, the control register provides simultaneous enable signals to the thermal sensor and to the temperature register to enable a new value to be set to the temperature register. When the thermal sensor enable field is set, the A/D converter output is latched each clock pulse. It allows a window to be set to record the temperature at some interval that is selected as a specific number of clock pulses. This helps to reduce the power consumed by the thermal diode and the A/D converter. The control register enable bit also enables the comparator and the interrupt registers to perform a comparison on the new value and store results in the interrupt registers.

Figure 3:
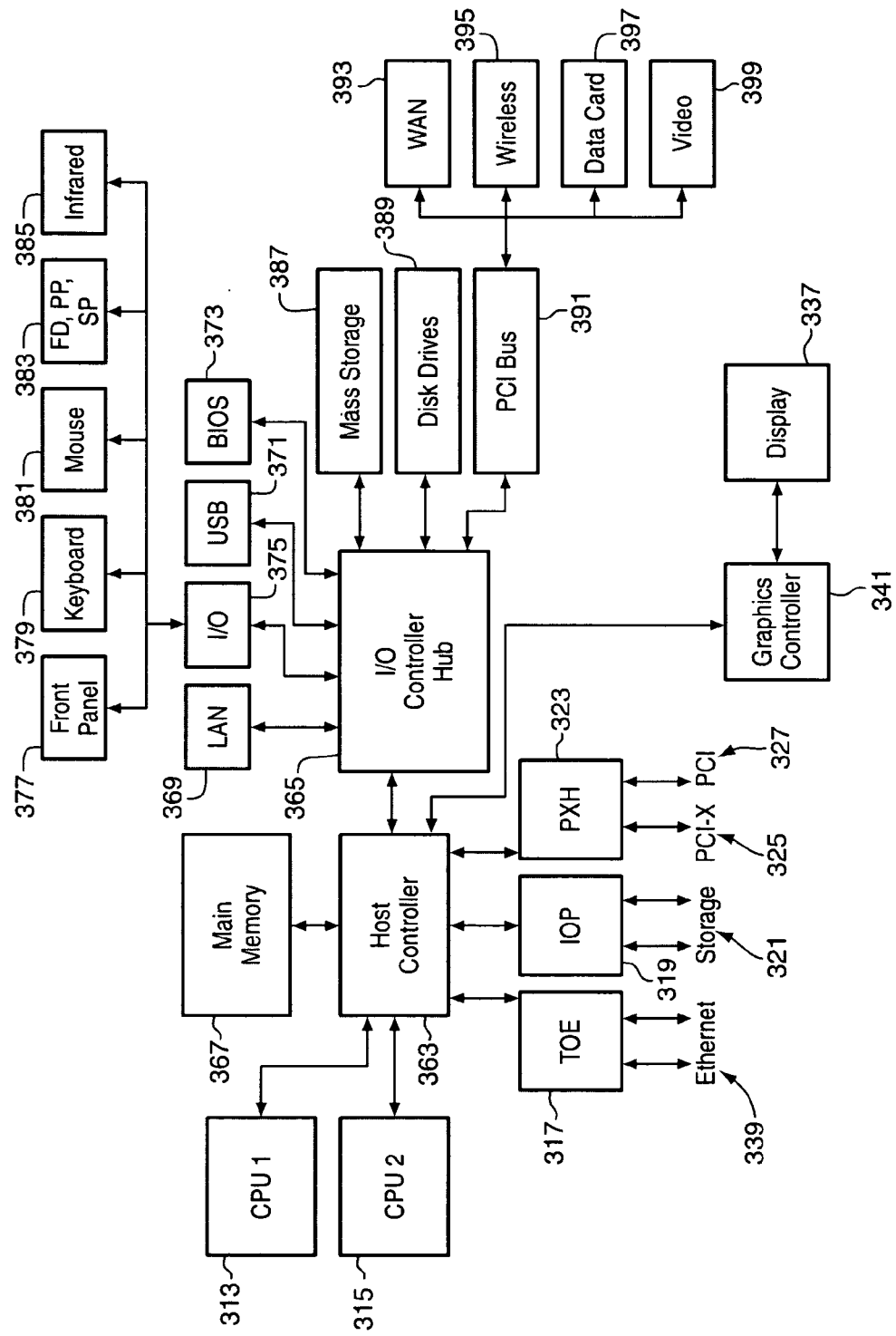
FIG. 3 is block diagram of a computer system suitable for implementing an embodiment of the present invention.

FIG. 3 shows an example of a computer system suitable for implementing the present invention. A MCH chip, north bridge, or host controller 363 interfaces one or more CPUs (central processing unit) with memory and I/O devices and may provide a wide range of features such as increased performance, reliability, availability and serviceability, system management and hot plug exchange of CPUs. It may include I/O clusters, a memory controller, snoop filters, and a wide range of logic for handling transactions. While the example of FIG. 3, includes a microprocessor coupled to a MCH and an ICH (Input/Ouput Controller Hub), either the MCH or the ICH or both or any of the functions of these chips may be incorporated into the microprocessor. The MCH and the ICH may also be combined, in whole or in part, inside of or outside of the microprocessor.

In the example of FIG. 3, the MCH 363 has a pair of FSBs (front side bus) each coupled to a CPU or processor core 313, 315. More or less than two processor cores and FSBs may be used. Any number of different CPUs and chipsets may be used. The MCH receives and fulfills read, write and fetch instructions from the processor cores over the FSBs. The MCH also has an interface to system memory 367, such as DIMMs (Dual In-line Memory Modules) in which instructions and data may be stored, and an interface to an ICH (input/output controller hub) 365.

The MCH also has an interface, such as a PCI (peripheral component interconnect) Express, or AGP (accelerated graphics port) interface to couple with a graphics controller 341 which, in turn provides graphics and possible audio to a display 337. The PCI Express interface may also be used to couple to other high speed devices. In the example of FIG. 3, six x4 PCI Express lanes are shown. Two lanes connect to a TCP/IP (Transmission Control Protocol/Internet Protocol) Offload Engine 317 which may connect to network or TCP/IP devices such as a Gigabit Ethernet controllers 339. Two lanes connect to an I/O Processor node 319 which can support storage devices 321 using SCSI (Small Computer System Interface), RAID (Redundant Array of Independent Disks) or other interfaces. Two more lanes connect to a PCI translator hub 323 which may support interfaces to connect PCI-X 325 and PCI 327 devices. The PCI Express interface may support more or fewer devices than are shown here. In addition, while PCI Express and AGP are described, the MCH may be adapted to support other protocols and interfaces instead of, or in addition to those described.

The ICH 365 offers possible connectivity to a wide range of different devices. Well-established conventions and protocols may be used for these connections. The connections may include a LAN (Local Area Network) port 369, a USB hub 371, and a local BIOS (Basic Input/Output System) flash memory 373. A SIO (Super Input/Output) port 375 may provide connectivity for a front panel 377 with buttons and a display, a keyboard 379, a mouse 381, and infrared devices 385, such as IR blasters or remote control sensors. The I/O port may also support floppy disk, parallel port, and serial port connections 383. Alternatively, any one or more of these devices may be supported from a USB, PCI or any other type of bus or interconnect.

The ICH may also provide an IDE (Integrated Device Electronics) bus or SATA (serial advanced technology attachment) bus for connections to disk drives 387, 389 or other large memory devices. The mass storage may include hard disk drives and optical drives. So, for example, software programs, parameters or user data, may be stored on a hard disk drive or other drive. A PCI (Peripheral Component Interconnect) bus 391 is coupled to the ICH and allows a wide range of devices and ports to be coupled to the ICH. The examples in FIG. 3 include a WAN (Wide Area Network) port 393, a Wireless port 395, a data card connector 397, and a video adapter card 399. There are many more devices available for connection to a PCI port and many more possible functions. The PCI devices may allow for connections to local equipment, or nearby computers. They may also allow for connection to various peripherals, such as printers, scanners, recorders, displays and more. They may also allow for wired or wireless connections to more remote equipment or any of a number of different interfaces.

The particular nature of any attached devices may be adapted to the intended use of the device. Any one or more of the devices, buses, or interconnects may be eliminated from this system and other may be added. For example, video may be provided on the PCI bus, on an AGP bus, through the PCI Express bus or through an integrated graphics portion of the host controller.

Considering the thermal conditions of the host controller 363, any one or more of the attached devices may generate a large amount of high speed traffic that may elevate the temperature of the chip. For example, frequent memory accesses or heavy Direct Memory Access (DMA) I/O traffic may require a large amount of data to be accessed and transported with addressing information at a high speed. In one embodiment, an operating system executed by the system works with a thermal sensor integrated on the host controller. The operating system monitors the activity level in the system and throttles traffic on the various interfaces if the temperature of the host controller increases beyond a certain threshold due to events such as a power virus, hacker activity or a spike in request rates. Other measures may also be taken such as changes in cooling rates.

Figure 4:
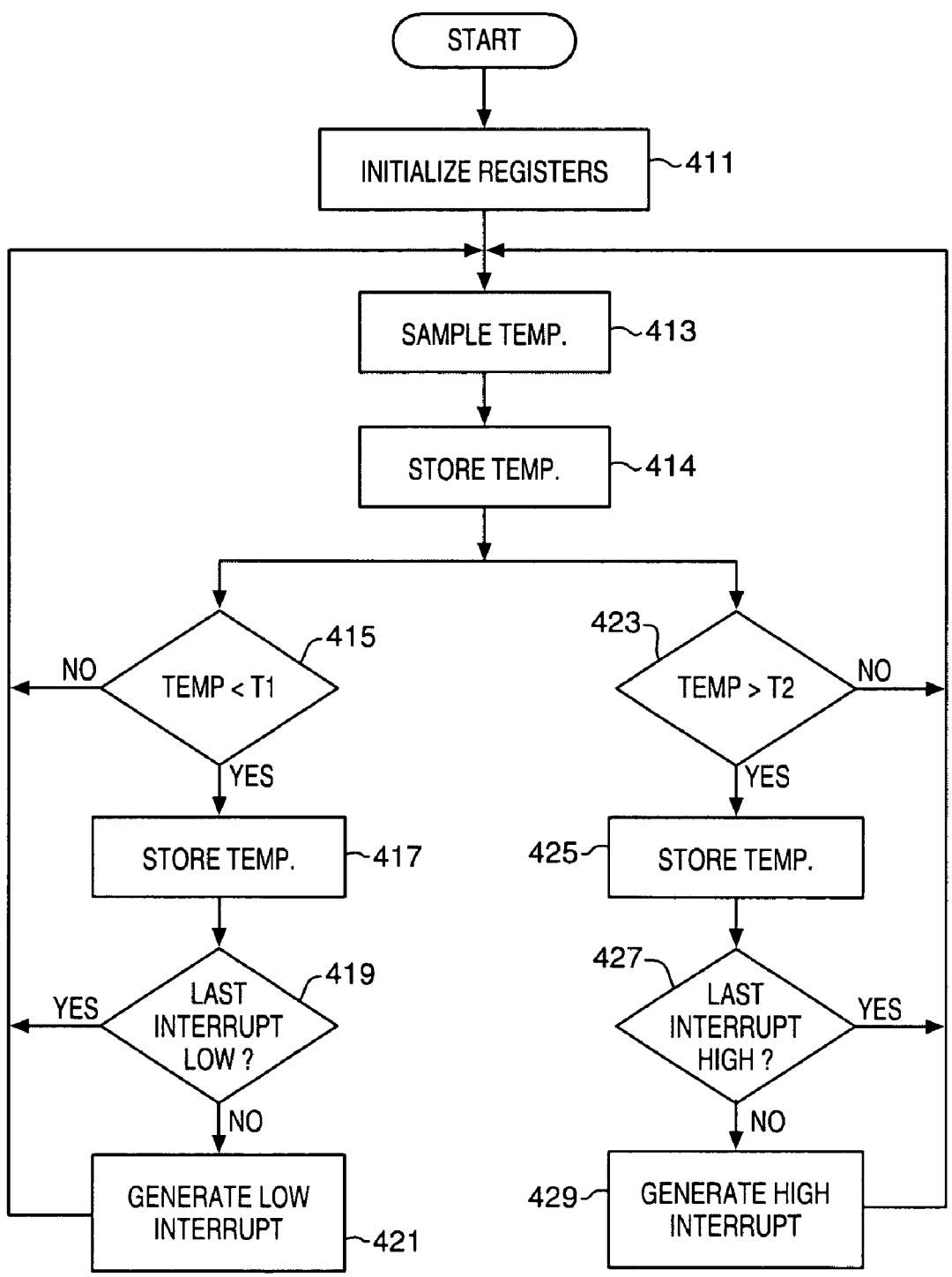
FIG. 4 is a flow diagram of monitoring temperature according to an embodiment of the present invention.

FIG. 4 shows an example process flow for signaling thermal events according to an embodiment of the present invention. In FIG. 4, a process may begin at block 411 by resetting all the registers mentioned above with respect to FIG. 2. The interrupt and temperature registers may be cleared while the high and low threshold registers may be reset from a ROM (read only memory). Alternatively, the high and low thresholds may be set by software or fixed. The initialization may occur on start up or at some other fixed time. With the system initialized, the temperature of the die is sampled at block 413. This may be triggered by an enable signal from a control register 223 that is applied to an A/D converter 121 coupled to a thermal diode 119. The enable signal may be applied as frequently as every few hundred milliseconds or every few hundred microseconds. The timing between temperature measurements may be selected to accommodate the thermal characteristics of the device and the environment in which it operates. At block 414, the sampled temperature is stored in a register for comparison purposes. It may also be stored for event logging.

The sampled temperature is then compared to a high threshold and a low threshold. At block 415, if the sampled temperature is above the low threshold, then the process returns to compare the next temperature sample. The timing of the temperature sampling may be controlled by a pulse generator 123 and a control register 223. However, if at block 415, the sampled temperature is less than the low threshold then the temperature value may be stored in a register 217 at block 417 for access by other processes. The temperature registers provide a history that can be used by a thermal management system in making decisions.

The interrupt registers 217 are also checked at block 419. If the last interrupt was a low interrupt, then the process cycles around for the next time that the temperature will be sampled. On the other hand, if the last interrupt was not a low interrupt, then at block 421, an interrupt is generated. This low interrupt may be asserted on external error pins of the die. The interrupts together with the stored temperature measurements are placed in registers accessible by a thermal management system. The thermal management system, as mentioned above may exist in dedicated hardware, a software process at the die level or in an operating system. The low interrupt may be used as an indication that the chip may be set for maximum speed or traffic without risk.

The sampled temperature is also compared to a high threshold at block 423. If the sampled temperature is below the high threshold, then the process returns to check the next temperature sample. However, if the sampled temperature is above the high threshold, then the measured temperature may be stored in a history and status register at block 425. The interrupt registers are also checked at block 427 and if the last interrupt was a high interrupt, then the process returns to await the next temperature sample.

On the other hand, if the last interrupt was not a high interrupt, then a high interrupt is generated at block 429. The interrupt may be asserted on external error pins of the die. The high interrupt may be used as an indication to software that the activity level of the die has increased beyond the maximum threshold and attention is required immediately, such as throttling the traffic, to reduce the die temperature. Otherwise the chip may fail to operate or burn out.

The high and low interrupt registers may be made accessible to the thermal management system so that after a thermal interrupt is serviced, the registers may be reset. The temperature logs may also be read out and reset. This allows great flexibility in the design of the thermal management system. Clearing the interrupt registers may also allow the interrupts asserted on the external pins to be released. The interrupts provide a quick notification to the thermal management system that a change in the thermal condition of the die has occurred. The thermal management system may then access the temperature logs to determine what, if any, action may be appropriate based on current conditions and on history.

Figure 5:
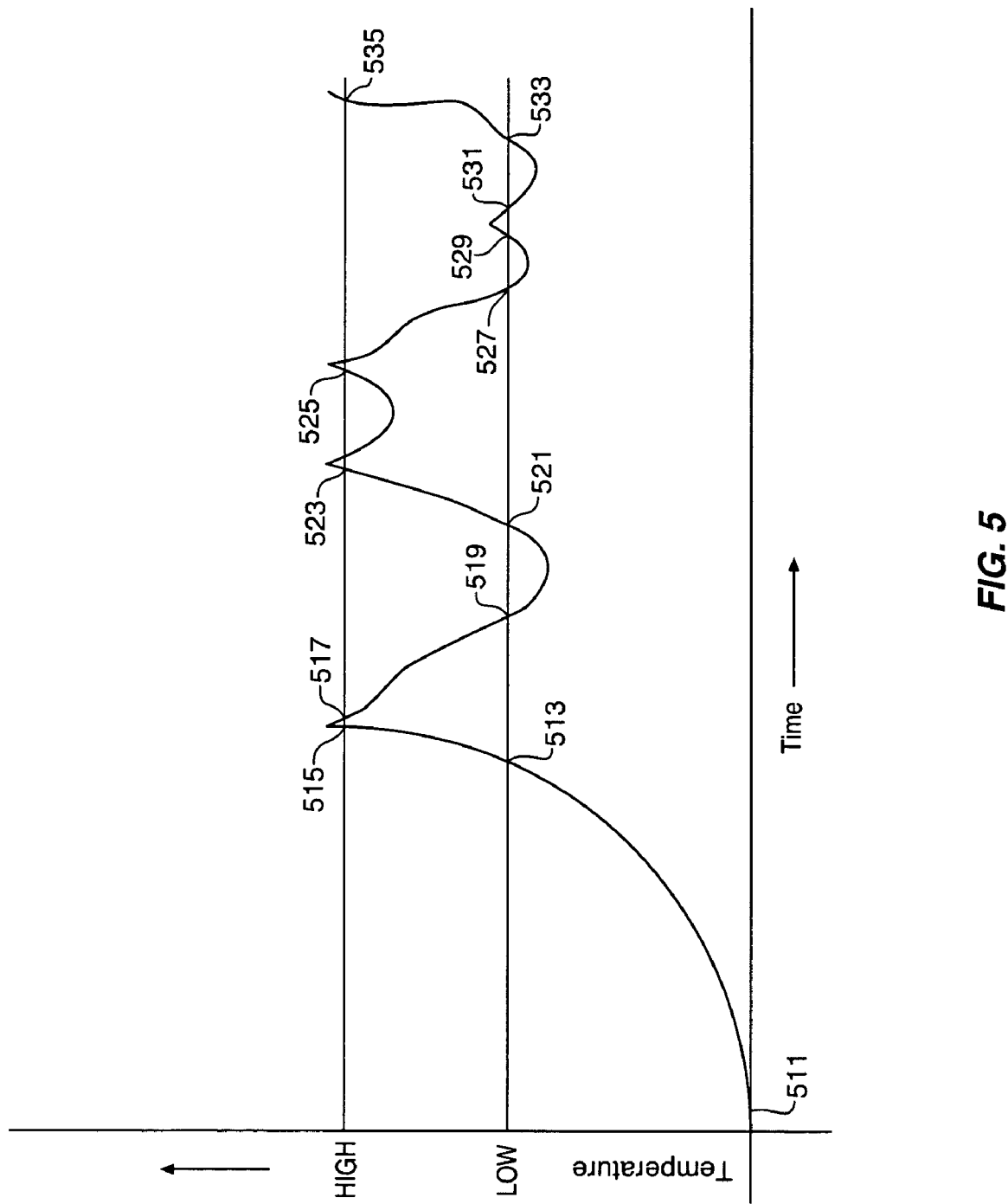
FIG. 5 is a graph of temperature changes over time in a semiconductor die as may occur according to an embodiment of the present invention.

FIG. 5 shows a hypothetical example of a sequence of temperatures, plotted along the vertical axis, that a die may experience over time, plotted along the horizontal axis. The example temperatures are selected to illustrate a possible operation of an embodiment of the invention and may not reflect the history for any one die in actual operating conditions. The die begins at the far left of the example chart at a very low temperature at point 511. This may correspond to a start up sequence that is used to initialize a system that has just been turned on. Chipset activity then increases causing the sensed temperature to move beyond the low threshold trip point at point 513 and the high threshold trip points at point 515. A high interrupt is generated after point 515. When the thermal management system, in response to the high interrupt, throttles activity, the sampled temperature begins to fall. At point 517, it crosses the high threshold trip point and decreases gradually. When, at point 519, it falls below the low threshold, then a low interrupt is generated to indicate that the temperature is well under safe limits.

The thermal management system will likely then increase chipset activity to take advantage of the additional thermal margin. The temperature accordingly increases again and at point 521 passes the low threshold. At point 523, the temperature again passes the high threshold and another high interrupt is generated. The thermal management system may again throttle activity to control the temperature and the temperature drops below the high threshold. At point 525, the temperature again increases above the high threshold but since the last interrupt was a high interrupt at point 523, no new interrupt is generated. The thermal management system will probably not take any additional or other action.

The next temperature threshold crossing comes at point 527 when the temperature crosses the low threshold again. Since the last interrupt was a high interrupt, a low interrupt is generated and the throttling will probably be shut off. At a new higher level of activity the temperature then moves above and below the low threshold at points 529, 531, and 533 but no new interrupts are generated. When a prior interrupt at high or low has been generated and the temperature oscillates between that high or low threshold increasing above it or falling below it, then no new interrupts are generated. This provides thermal conditioning or hysteresis for noise and other external disturbances that may place the temperature above the trip points. It thereby prevents inadvertent interrupts from being generated. The next interrupt in FIG. 5, comes at point 535 after the temperature rises above the high threshold.

The thermal behavior of the die in FIG. 5 may appear to be erratic and extreme, however, the temperature changes are shown as an example to illustrate the generation of interrupts and application of thermal measures. In many applications, temperature may change quickly due to uneven demands that are placed on the die. For an MCH chip in a server environment, a very high rate of file accesses, a large outside demand on a particular page from a web server, or a malicious denial of service attack may all cause abnormal increases in chip activity and affect the MCH chip's temperature. For an MCH chip in a personal computing environment for example, extreme video, gaming or scientific calculation demands may cause the temperature to be elevated.

It is to be appreciated that a lesser or more equipped thermal sensor circuitry, control loop, corrective actions, and computer environment than the examples described above may be preferred for certain implementations. Therefore, the configuration of the thermal system and the computer system will vary from implementation to implementation depending upon numerous factors, such as price constraints, performance requirements, technological improvements, or other circumstances. Embodiments of the invention may also be applied to other types of software-driven systems that use different hardware architectures than that shown in the Figures.

While embodiments of the invention have been described in the context of a memory controller hub chip coupled to a microprocessors, memory, an I/O controller hub and other interconnects, embodiments of the invention may also be applied to a wide range of other devices. Embodiments of the invention may be applied to any device that transfers data between other devices based on timing and commands from the other devices. Embodiments of the invention may also be applied to a wide variety of chips that experience large fluctuations in activity. Further embodiments of the invention may be applied to I/O controller and memory controller hubs.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a media center (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

The invention claimed is:

1. A method comprising:
sensing the temperature of a input/output device, the input/output device carrying traffic between a microprocessor and a memory;
storing the sensed temperature in a temperature register;
comparing the stored temperature to a high threshold;

storing the temperature in a first history register for access by other processes of a thermal management system if the stored temperature is above the high threshold;

generating a high interrupt if the stored temperature is above the high threshold and if the last interrupt was not a high interrupt;

placing the high interrupt in a register accessible to the thermal management system if the high interrupt is generated;

comparing the temperature to a low threshold;

storing the temperature in a second history register for access by other processes of the thermal management system if the stored temperature is less than the low threshold;

generating a low interrupt if the stored temperature is less than the low threshold and if the last interrupt was not a low interrupt;

placing the low interrupt in a register accessible to the thermal management system if the low interrupt is generated;

servicing the interrupt registers by the thermal management system;

applying the interrupts as commands to the thermal management system; and applying a measure to adjust the temperature of the input/output device based on the interrupt registers.

2. The method of claim 1, further comprising asserting the interrupt on an external pin of the semiconductor device.

3. The method of claim 1, further comprising applying the interrupt to a mask register to mask interrupts that are the same as an immediately previous interrupt.

4. The method of claim 1, wherein applying a measure comprises changing the rate of traffic carried by the semiconductor device.

5. The method of claim 4, wherein changing the rate of traffic comprises detecting an interrupt at a processor that is coupled to the input/output device and changing the rate of traffic requested by the processor.

6. The method of claim 1, wherein sensing a temperature comprises applying a thermal diode voltage to a digital converter, and applying the converted digital temperature to a calibrated offset value.

7. The method of claim 6, further comprising calibrating the digital converter by applying a test signal to the converter, comparing the signal to a desired result, and adjusting the converter based on the comparison.

8. The method of claim 1, wherein applying a measure comprises throttling traffic carried by the input/output device.

9. The method of claim 1, wherein applying a measure comprises generating a high interrupt to a microprocessor if the temperature is above the threshold and a low interrupt to the microprocessor if the temperature is below the threshold.

10. A machine-readable medium comprising instructions that, when executed by a machine, cause the machine to perform operations comprising:

detecting a temperature of a semiconductor device at a thermal sensor on the semiconductor device;

storing the detected temperature in a temperature register;

comparing the stored temperature to a threshold;

storing the temperature in a first history register for access by other processes of a thermal management system if the stored temperature is above the threshold;

storing the temperature in a second history register for access by other processes of the thermal management system if the sensed temperature is less than the threshold;

generating a high interrupt if the temperature is above the threshold and if the last interrupt was not a high interrupt;

generating a low interrupt if the temperature is below the threshold and if the last interrupt was not a low interrupt placing the high interrupt in a register accessible to the thermal management system if the high interrupt is generated;

placing the low interrupt in a register accessible to the thermal management system if the low interrupt is generated;

servicing the interrupt registers by the thermal management system; and applying a measure to adjust the temperature of the semiconductor device based on the interrupt registers.

11. The medium of claim 10, wherein the instructions further cause the machine to perform operations comprising asserting the interrupts on an external pin of the semiconductor device.

12. The medium of claim 10, wherein the instructions for applying a measure comprise instructions for changing the rate of traffic carried by the semiconductor device.

13. The medium of claim 10, wherein the instructions for detecting a temperature comprise instructions for applying a thermal diode voltage to a digital converter and wherein the instructions further cause the machine to perform operations comprising calibrating the digital converter by applying a test signal to the converter, comparing the signal to a desired result, and adjusting the converter based on the comparison.

14. A semiconductor device comprising:

a temperature sensor to detect a temperature of the semiconductor device;

a temperature register to store the sensed temperature;

a comparator to compare the stored temperature to a high threshold and to a low threshold;

a first history register to store the temperature for access by other processes of a thermal management system if the stored temperature is above the high threshold;

a second history register to store the temperature for access by other processes of the thermal management system if the stored temperature is less than the low threshold;

interrupt logic to generate a high interrupt if the temperature is above the high threshold and if the last interrupt was not a high interrupt to generate and a low interrupt if the temperature is below the threshold and if the last interrupt was not a low interrupt;

an interrupt register accessible to the thermal management system for storing the high or the low interrupt if the high or the low interrupt is generated; and the thermal management system to service the interrupt register and the apply the interrupts as commands to adjust the temperature of the semiconductor device based on the interrupts.

15. The device of claim 14, further comprising a command register to assert the interrupts on an external pin of the semiconductor device.

16. The device of claim 14, further comprising a mask register to mask interrupts that are the same as an immediately previous interrupt.

17. The device of claim 14, wherein the temperature sensor comprises a thermal diode and a digital converter and wherein a thermal voltage from the thermal diode is converted by the digital converter and the converted digital temperature is applied to a calibrated offset value.

18. The device of claim 17, further comprising a self test engine coupled to the digital converter to calibrate the digital converter by applying a test signal to the converter, comparing the signal to a desired result, and adjusting the converter based on the comparison.

19. A computing system comprising:
- a processor to operate on data held in memory;
- a memory to hold data;
- an input/output device to carry data between the processor and the memory;
- a temperature sensor to detect a temperature of the input/output device;
- a temperature register to store the sensed temperature;
- a comparator to compare the detected temperature to a threshold; and
- a comparator to compare the stored temperature to a high threshold and to a low threshold;
- a first history register to store the temperature for access by other processes of a thermal management system if the stored temperature is above the high threshold;
- a second history register to store the temperature for access by other processes of the thermal management system if the stored temperature is less than the low threshold;
- interrupt logic to generate a high interrupt to the processor if the temperature is above the high threshold and if the last interrupt was not a high interrupt and to generate a low interrupt to the processor if the temperature is below the threshold and if the last interrupt was not a low interrupt;
- an interrupt register accessible to the thermal management system for storing the high or the low interrupt if the high or the low interrupt is generated; and
- the thermal management system on the processor to service the interrupt register and the apply the interrupts as commands to adjust the temperature of the input/output device based on the interrupts.

20. The system of claim 19, wherein the input/output device is in the form of a semiconductor chip with external pins coupled to the processor and wherein the input/output chip includes a command register to assert the interrupts on an external pin.

21. The device of claim 19, wherein the temperature sensor comprises a thermal diode voltage and a digital converter and wherein a thermal voltage from the thermal diode is converted by the digital converter and the converted digital temperature is applied to a calibrated offset value.

* * * * *